United States Patent

[11] 3,590,432

| | | |
|---|---|---|
| [72] | Inventor | Charles M. Schott, Jr.<br>Gloucester, Mass. |
| [21] | Appl. No. | 785,118 |
| [22] | Filed | Dec. 19, 1968 |
| [45] | Patented | July 6, 1971 |
| [73] | Assignee | Gloucester Engineering Co., Inc.<br>Gloucester, Mass. |

[54] ROTARY ASSEMBLY FOR MOLTEN PLASTIC
13 Claims, 12 Drawing Figs.

[52] U.S. Cl. ................................................ 18/14
[51] Int. Cl. ............................................. B29d 23/04
[50] Field of Search .................................... 18/14 R, 14 S, 40, 46; 277/235, DIG. 6

[56] References Cited
UNITED STATES PATENTS

| | | | |
|---|---|---|---|
| 3,122,788 | 3/1964 | Lieberman .................... | 18/14 X |
| 3,388,426 | 6/1968 | Schott, Jr. ................... | 18/14 |
| 3,422,493 | 1/1969 | Heston ....................... | 18/14 |

Primary Examiner—Andrew R. Juhasz
Attorney—John Noel Williams

ABSTRACT: Rotary apparatus for molten plastic having sealed transition between stationary and rotary sections. A removable insert forming the stationary conduit supports the seal or transition member, the extruder adapter directly engages and seals against the insert member, and this member also is loosely fitted in its housing and held against an alignment surface by the adapter; the transition member provides a smooth bore transition from the stationary to rotary conduit surfaces; a sintered spherical bronze base filled with a mixture of fluorocarbon plastic and lead provides a sealing surface at the point of relative movement; spaced-apart stationary and rotary sections are sealed by low friction plastic sealing members or sealing members of hard material, and in the latter case the rotary and stationary members are preloaded toward each other, advantageously using conical springs urged against the bearing assembly.

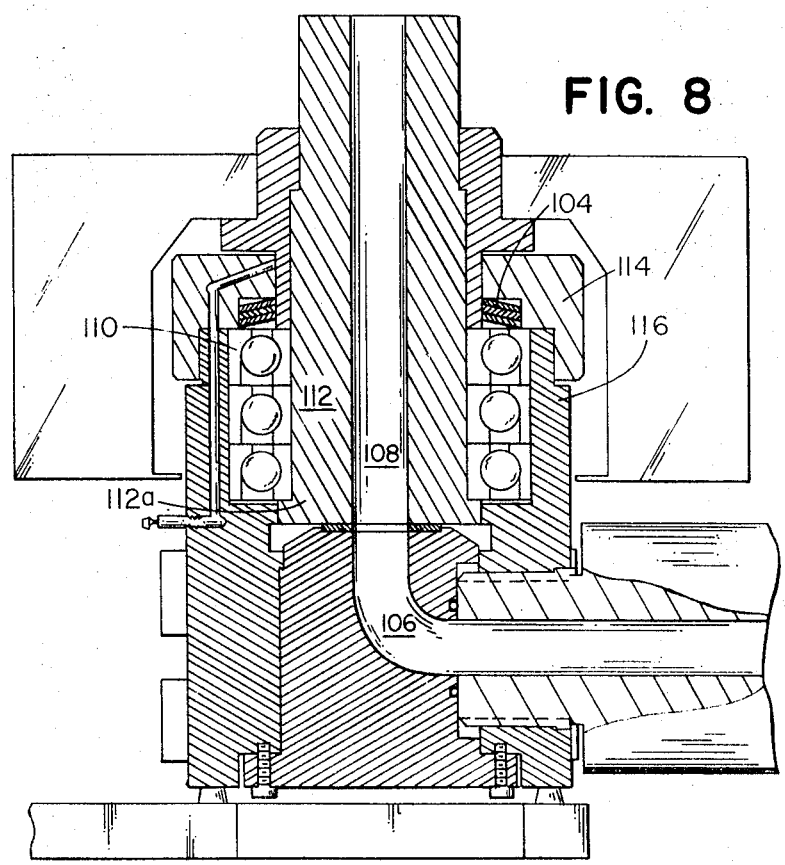
FIG. 8
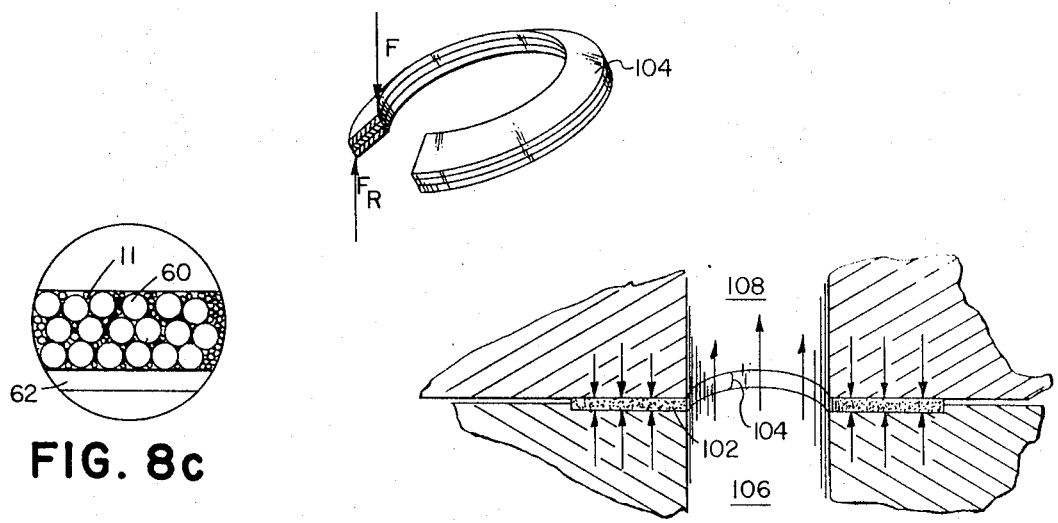
FIG. 8a
FIG. 8c
FIG. 8b

ROTARY ASSEMBLY FOR MOLTEN PLASTIC

This invention relates to rotary apparatus for molten plastic.

In the process of plastic extrusion molten plastic under pressure passes from an extruder through an apparatus (in some instances referred to as a "rotator") which comprises stationary conduit and rotary conduit sections, leading to a die orifice. The plastic issues, e.g. in the form of a tube, from the die orifice, whereupon it is cooled. Efficient use of such apparatus is impaired by the complexity and difficulty in maintaining a proper seal between the stationary and rotary conduit sections and also between the stationary conduit section and the extruder. Also, with certain plastic materials, e.g. vinyls, the preferred rotary dies have not been used due to aging effects upon the portion of the plastic that is exposed directly to the stationary-to-rotary seal.

It is a primary object of the invention to provide an improved apparatus of this type which is simple, permits easy maintenance and is capable of operating at high temperatures, pressures and speeds. It is also an object of the invention to provide apparatus capable of handling a wide range of plastic materials including those sensitive to aging conditions.

Particular objects include the provision of a rotary seal which may be easily removed, inspected and cleaned and which can accommodate differences in tolerance between rotating and stationary parts while maintaining a leakproof seal.

In preferred embodiments, there is featured a leakproof rotary seal located at the end of a removable conduit-forming insert which fits within the stationary outer housing. Advantageously the insert or plug has an elbow-shaped conduit and a side face exposed and constructed to be sealably engaged directly by the extruder. Advantageously the insert is shaped to have a loose fit within the outer housing and to be pressed laterally against an alignment surface by the extruder whereby alignment can be achieved while the insert is easily removable when the extruder is withdrawn.

Other preferred embodiments feature rotary and stationary sections of a rotator mounted with a clearance spacing. A transition ring extends across the clearance, engaging the surfaces moving relative to each other, and has an internal bore surface which forms an aligned continuation of the conduit between the stationary section and the rotary die. One such embodiment features use of a transition ring of rigid material, and resilient forcing of the rotary and stationary sections against this transition ring.

Featured also are other particular seal constructions.

Other objects, features and advantages will appear from the following description of a preferred embodiment of the invention, taken together with the attached drawings thereof, in which:

FIG. 8 is a vertical cross-sectional view of another preferred embodiment;

FIG. 8a is a perspective view of spring members used in the embodiment of FIG. 8;

FIG. 8b is a vertical cross-sectional view, partially diagrammatic of the preloaded transition member in position;

FIG. 8c is a greatly magnified cross-sectional view of a portion of the transition member.

Figure 1:
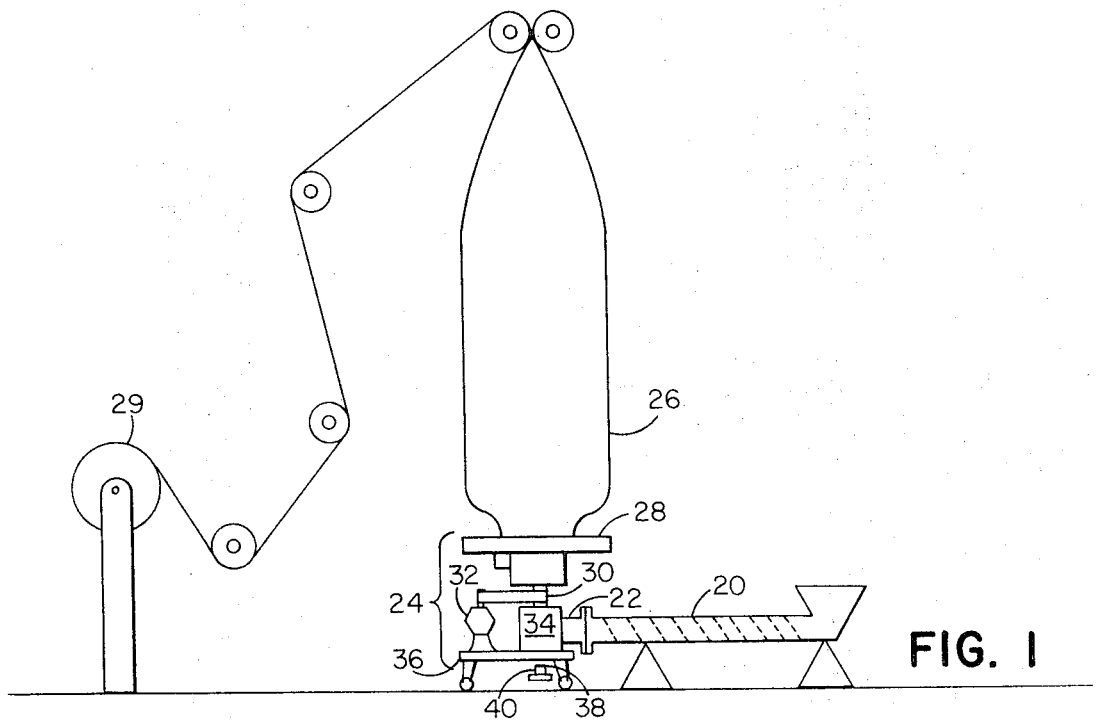
FIG. 1 is an overall view of a blown film extrusion line employing a preferred embodiment of a rotator according to the invention.

Referring to FIG. 1, an extruder 20 has a supply member or adapter 22 which discharges into a rotary die apparatus 24. Plastic film 26 is emitted from the apparatus in the form of a tube, which is expanded, e.g., by captured air, and after cooling is wound upon winder 29.

The die ring 28 which defines the annular film-emitting orifice is mounted on a hollow rotary spindle 30 driven by motor 32. Plastic from the extruder 20, 22 enters this spindle through the stationary housing 34 which supports the spindle. As shown, this housing and the motor are mounted upon a supporting frame 36 which can be wheeled into position relative to the extruder 20, 22. Below the frame 36 is the removable seal 38 and plug member 40, soon to be described in detail, in removed position.

Figure 2A:
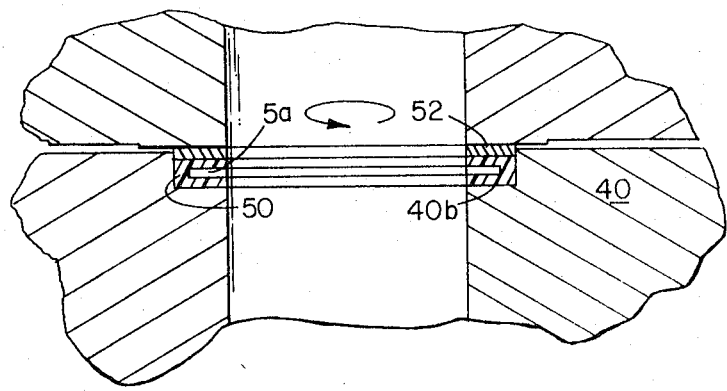
FIG. 2a is a vertical cross-sectional view on a larger scale of the junction between the rotary and stationary conduit sections.
Figure 2:
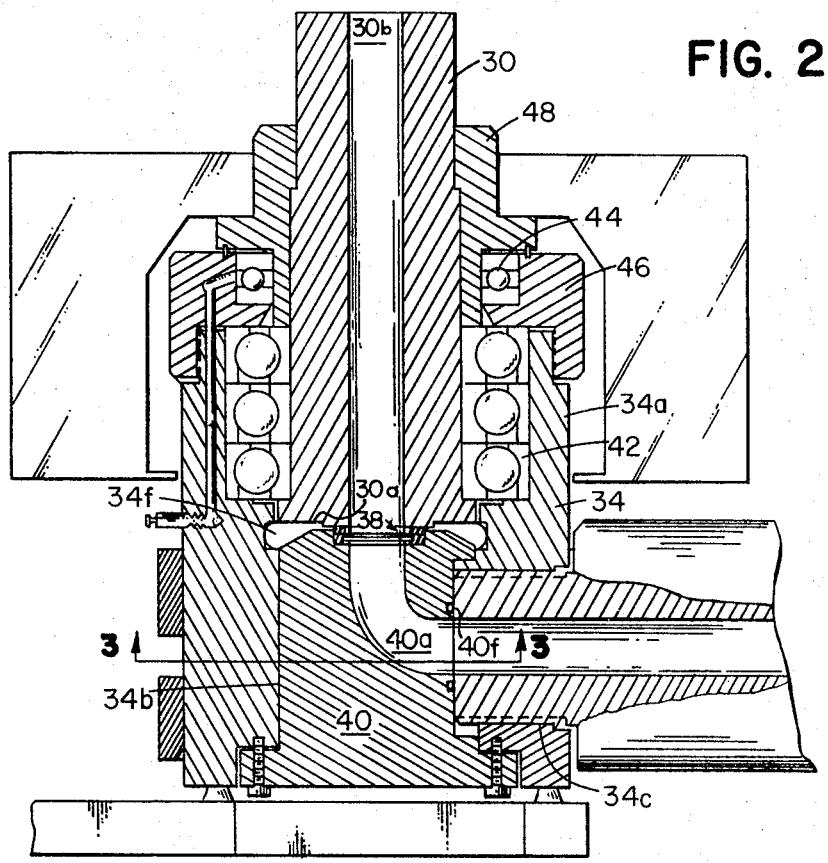
FIG. 2 is a vertical cross section view on an enlarged scale of the rotator shown in FIG. 1.

Referring to FIG. 2 the hollow rotary spindle 30 extends vertically down into the stationary housing 34, being supported therein by radial-thrust bearings 42 and thrust bearings 44. A bearing cap 46, mounted on the upper portion 34a of the stationary housing and a retainer 48 secured to rotate with the spindle, complete the bearing assembly.

Figure 4:
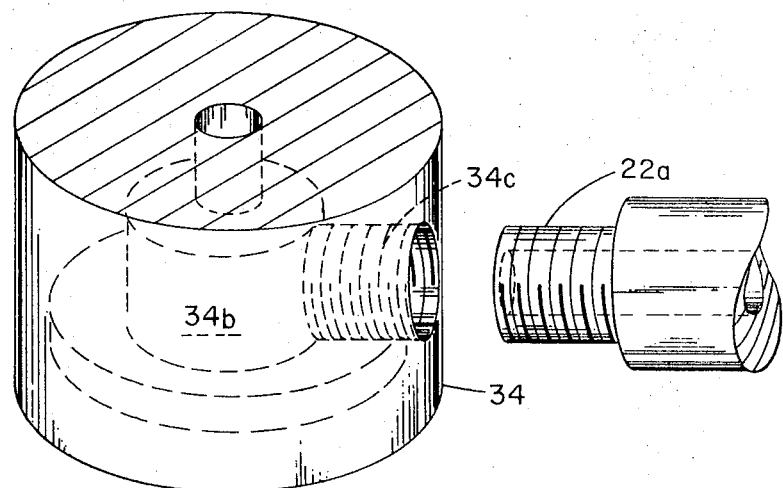
FIG. 4 is an exploded perspective view of the lower portion of the rotator of FIG. 1.
Figure 4:
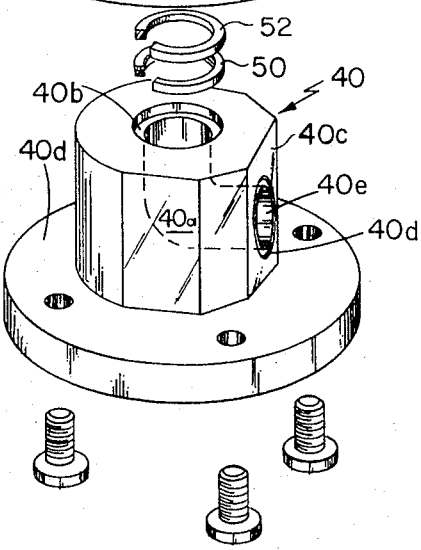

The rotary seal 38 is located at the lower end 30a of the spindle, spaced from the bearings, and accessible for maintenance and replacement without disturbing any of the above components. This is achieved by a central housing opening 34b (see also FIG. 4) which commences in the vicinity of the lower end 30a of the spindle 30 and extends downwardly to the bottom of the housing 34. Within this housing opening is secured a removable conduit-forming stationary plug 40 which has its upper end positioned immediately adjacent the lower end 30a of the spindle. The conduit 40a of the stationary plug discharges to the conduit 30b of the rotary spindle. To create a seal for the substantial pressure of the molten plastic (e.g., as high as 10,000 p.s.i.), this preferred embodiment employs a particular seal. Referring to FIGS. 2, 2a and 4 an annular cup packing 50 having an inner open slot 50a exposed to the interior of the conduit, is retained in recess 40b formed in the end of plug 40. This cup packing has the conventional ability to expand axially under the influence of fluid pressure within slot 50a. A second member, a face seal 52, is disposed over the cup packing in a position to be pressed by the fluid pressure against the end surface 30a of spindle 30. Featured in this construction is the nature of the material used for the face seal. It is a material—ordinarily used in bearings but not in seals—which is found to give excellent sealing ability in this high pressure, high temperature environment. The active surface (i.e. the surface at which relative movement occurs) of the face seal member is a matrix in the form of a sintered thin porous layer of spherical bronze particles 60 (see FIG. 8c) supported on a thin steel backing 62, with this porous layer impregnated with a low friction plastic (e.g. Dupont's Teflon) lead powder mixture. Bearings of this kind (but for novel use here as face seals) are available under the trademark "DU," from Garlock Inc., Camden, N.J.

As suggested by FIG. 4 when the holding bolts are removed from the bottom flange of the plug, and the extruder adapter member 22 loosened, the plug is removable by downward movement, away from the die. Thus the seal is readily accessible and can be inspected and replaced without the time consuming work of dismantling and replacing the die spindle, or bearing assembly.

The apparatus of FIGS. 1—4 illustrates other features of the plug assembly. As shown the conduit within the plug is elbow-shaped and extends from the rotary spindle the complete distance to the extruder adapter member 22, making the conduit extremely easy to clean. For this purpose an open passage 34c is provided in housing 34 exposing the side surface 40c of the plug 40, and the end 22a of the extruder adapter is threaded through this passage into direct contact with the side surface 40c of the plug, so that the conduit 20b of the extruder adapter discharges directly into the conduit 40a of the plug through opening 40e.

This plug side surface 40c, exposed to the lateral housing opening, is flat and is provided with an annular groove 40d, concentric with the side opening 40e of the conduit 40a. An "O" ring 40f is disposed in this groove with which the end surface of the extruder 22a engages. This simple sealing arrangement illustrates another feature of the invention.

Figure 3:
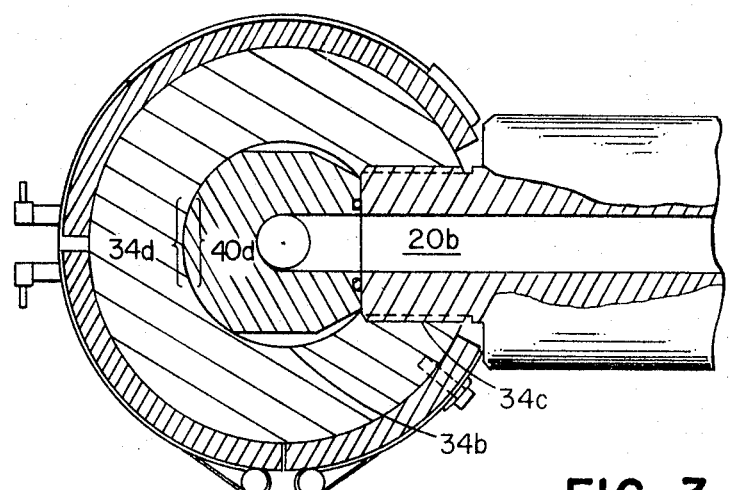
FIG. 3 is a horizontal cross section view taken on line 3-3 of FIG. 2.

Furthermore, the plug 40 is specially shaped to loosely fit within opening 34b of the housing. Here the sides of the plug (originally cylindrical) are milled to provide clearance flats, so that although the basic diameter of the plug matches the opening with close tolerance, the portions that are removed when providing the flats result in a loose fit. The side 40d of the plug opposite from the extruder opening 40e retains its original mating form with the corresponding portion 34d of the bore of the housing. Thus when the extruder adapter is tightened against plug 40, bore surface 34d is engaged by the plug surface 40d and aligns the plug with the rotary spindle 30, as illustrated by FIGS. 2 and 3. However when the extruder adapter 33 is removed the plug 40 fits loosely, and although filled with plastic, it is readily removable because of its loose fit.

In operation, plastic proceeds from the extruder into the elbow of the plug 40 of FIGS. 1—4, thence turns, enters the hollow rotating spindle 30 and proceeds to the rotating die attached to and rotatable with spindle 30 where it emits as, in the case of this illustrative embodiment, plastic film. As is known, one advantage of so rotating the die is to avoid cumulative effects in rolling of the formed film, should the die orifice not have identical dimensions at all points of its circumference. This advantage is realized according to this embodiment by means of an exceedingly simple and efficient rotary apparatus, which can withstand pressures up to 9000 p.s.i. Should leaking occur a path 34f (formed in the housing 34, exposing the upper end of the plug to the atmosphere) conducts the plastic away, and avoids plastic being forced into the bearings, this being another important feature.

Frequently (under some conditions as frequent as once a week or even once a day) it is necessary to stop the machine and clean the conduits and die. For the reasons mentioned, this is a very simple procedure with apparatus employing the features illustrated in FIGS. 1—4.

Under certain conditions as with plastics which are extremely subject to aging, seals such as shown in the preceding embodiment may cause "hang-ups" or delay of the plastic directly contacting the seal surfaces, and this plastic then would deteriorate, and cause weak or discolored areas to occur in the product being formed.

Figure 6:
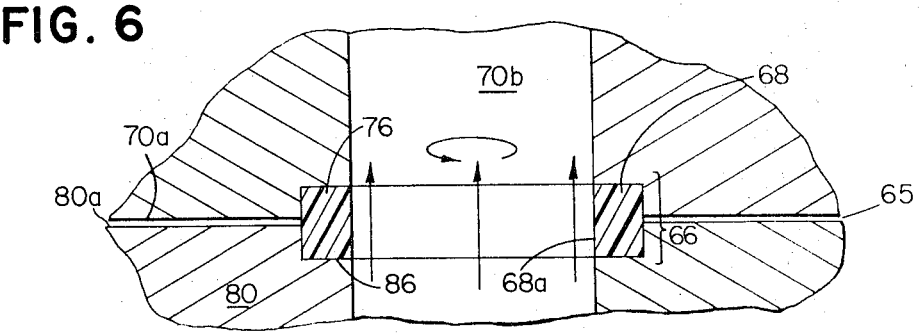
FIG. 6 is a vertical cross section view, on a larger scale, of the transition member of FIG. 5.
Figure 5:
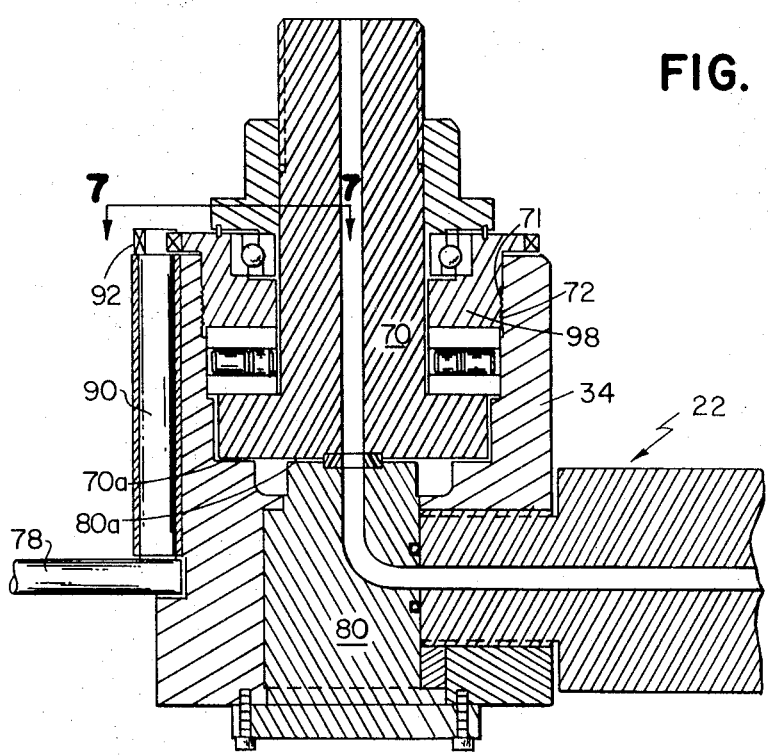
FIG. 5 is a vertical cross section view, similar to FIG. 2, of another preferred embodiment of the invention.
Figure 7:
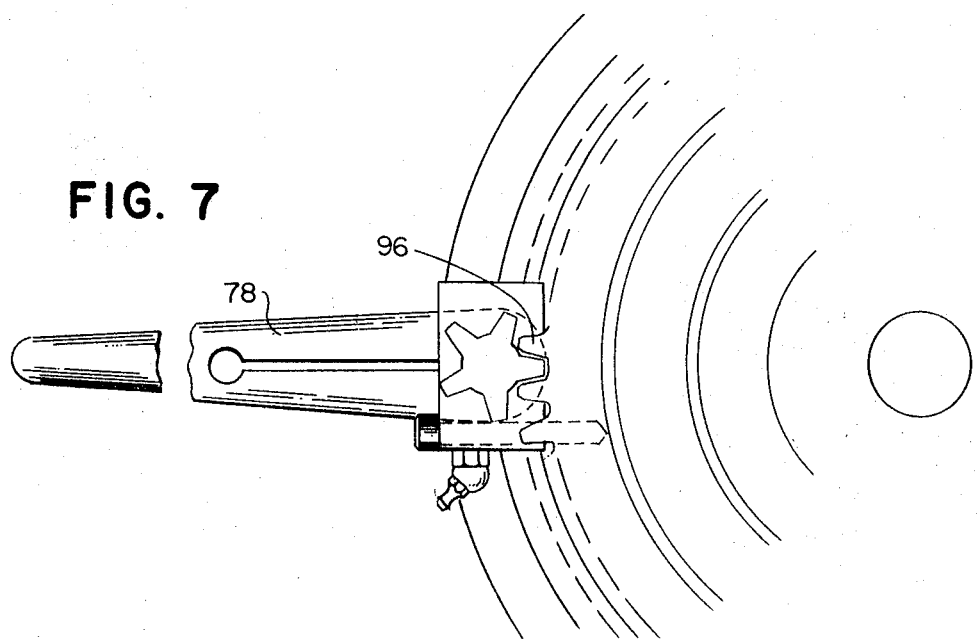
FIG. 7 is a horizontal view taken on line 7-7 of FIG. 5.

Referring to FIGS. 5, 6 and 7 other features are illustrated which overcome this problem. The apparatus shown is much the same as the preceding embodiment.

In this embodiment, however, rotary die spindle 70 is supported (at spindle support threads 71 by outer housing threads 72) so that the bottom surface 70a of the spindle 70 is in only a slightly spaced-apart position (e.g. clearance of 0.002—0.004 inch) from the top surface 80a of the member forming the stationary conduit (here plug 80). Annular grooves 76 and 86 are formed in spindle surface 70a and top surface 80a, opening into the conduit, forming an open annular (but interrupted by clearance slot 65) groove 66 with approximately square cross section. Groove 66 is filled with an annular transition member 68, the member extending across clearance slot 65, and having a cold-flow-resistant characteristic (explained more fully below). The inner surface of transition member 68 is substantially smoothly aligned with the adjacent conduit surfaces 80b (in stationary plug member 80), and 70b (in spindle 70), thus forming a substantially continuous conduit wall.

Gap adjustment handle 78 (FIGS. 5 and 7) is mounted on the side of the outer housing to rotate vertical shaft 90 and gear 92, whose teeth engage gear teeth 96 on rotary spindle support 98.

In operation, molten plastic is forced by the extruder through the stationary conduit and upward into the rotary spindle conduit section. The radial pressure of the molten plastic against the inner surface 68a of transition member 68 holds it in place within groove 66.

Referring to FIG. 6, despite conduit 80b being stationary, conduit 70b rotating, and transition member having an undetermined motion condition, and despite the extreme pressure and high temperature of the molten plastic, the plastic is contained by direct exposure to the smooth (and advantageously low friction) transition member. The molten plastic flows smoothly at the conduit walls as well as in the center, as indicated by the arrows of FIG. 6, and none is delayed, or hung up, to the extent of causing aging, degradation and eventual contamination of the extruding plastic.

The shear strength of the transition member 68 at operating temperature, and its other properties contributing to its cold-flow resistance, are important to successful operation, to resist flow of the member into the clearance 65 between plug top surface 80a and spindle bottom surface 70a. The apparatus can withstand pressures up to 5,000 p.s.i. if the material of transition member 68 is a properly selected T.F.E. fluorocarbon plastic (Dupont "Teflon") and clearance slot 65 is less than five-thousandths of an inch. Other materials will be found appropriate for other clearances.

It may be expected that the transition member will in time wear away, or otherwise cease to properly fill the groove. While this might detract from the usefulness of the present feature in rotators of certain prior designs, the problem is met by combination with the removable insert feature which permits rapid removal and replacement of the seal as described above. The problem is also met in part in the combination with the adjustment feature which permits adjustment both of the clearance and the size of the transition-member containing groove. With the adjustment device shown (which of course is only one of numerous possibilities) rotation of handle 78 through 180° rotates spindle threads 71 relative to supporting threads 72 and adjusts clearance 65 between a minimum 0.001 inch and a maximum 0.005 inch. This adjustment enables compression of the transition member to regain proper filling of the groove. Even extrusion to some extent of portions of the transition member into the clearance slot may be tolerated when a low friction substance such as t.f.e. fluorocarbon plastic is employed for the transition member.

Referring now to FIGS. 8—8c rotator here shown differs from the previous embodiments in employing a transition member 102 of rigid material which is resiliently preloaded under the influence of springs 104 which urge the entire rotary section against the transition member 102. While other low-friction materials such as carbon may be used in certain instances, in other instances the "DU" material discovered for use in the embodiment of FIGS. 2 and 2a is likewise applicable here, with the further advantage of producing a smooth conduit transition surface 107 from stationary conduit 106 and rotary conduit 108.

In this embodiment the lower spindle surface bears directly upon the transition member and the transition member serves to maintain a clearance between the relatively moving surfaces. The spindle surface is urged against the transition member low-friction surface with a pressure in excess of 10,000 p.s.i., (illustrated by the opposed arrows of FIG. 8b), thus resisting leakage of molten plastic in the conduit, and the plastic flows smoothly as indicated by the flow arrows.

Resilient urging of the rotary section against the transition member not only provides allowance for wear of the transition member but also provides, where desired, a pressure relief system to prevent buildup of excess pressure of molten plastic in the conduit. Thus if the pressure of the molten plastic exceeds the preload pressure against the transition member the molten plastic may temporarily separate the mating surfaces and flow out the relief passage 34f without contaminating the bearings. Upon restoration of normal pressure the surfaces would reseat under the influence of the resiliently applied forces.

In the embodiment of FIGS. 8 and 8a these forces are applied by means of conical annular spring members, e.g. "Belleville" spring 104. As shown in FIG. 8 the outer diameter of a stacked series of these springs corresponds with and bears upon the outer race of radial bearing 110 which rotatably position the spindle 112. The inner race of the lowest bearing ring bears against a flange 112a of the spindle 112. The bearing cap 114, threaded to the housing 116 bears heavily on the inner portion of the spring 104 (applying force F thereto) setting up the reaction force $F_r$ by the outer race, and thus applying pressure through the bearing assembly and the spindle flange 112a to the stationary-rotary mating surfaces at the transition member. It is a virtue of this general construction that only one bearing set is required and the spacing effect of the transition member avoids otherwise providing for clearance spacing.

The spring system is provided with a low spring rate so that a relatively great amount of pretravel is required to apply the load, relative to the amount of travel of the spindle during wear of the transition member or relieving movement. The particular spring system shown readily and simply achieves this.

Other examples of means for applying the force in a resilient manner are the use of helical compression springs, either a large spring surrounding the spindle or a series of small springs arranged around the spindle. Or other surfaces in the system may be formed of resilient substances.

The foregoing embodiment has the advantage of no inward or outward bulging at the transition surface as may be slightly observed with the embodiment of FIG. 6 or the embodiment of FIG. 2a (when the annular slot is permanently filled, e.g. with high temperature rubber to provide a smooth internal bore to the sealing or transition member).

Other embodiments will occur to those skilled in the art and are within the following claims.

What I claim is:

1. Apparatus constructed to deliver molten plastic from an extruder to a rotary die orifice, said apparatus including a stationary conduit section and a rotary conduit section, said stationary section comprising an outer housing and a removable conduit-forming plug disposed there within, said stationary housing secured in supporting relation to said rotary conduit section, said plug having an outlet end adjacent to and communicating with said rotary section, a rotary seal disposed on the end of said plug arranged to form a seal between said stationary and rotary sections, said seal and plug being removable from said outer housing in the direction away from said rotary section without disturbing said rotary section.

2. The apparatus of claim 1 wherein said rotary section includes a hollow spindle, said spindle rotatably mounted by bearings secured to said outer housing, said plug being removable without disturbing said spindle or bearings.

3. Apparatus according to claim 1 wherein the plug and housing are cooperatively constructed to expose a surface of said plug having a conduit inlet opening for direct engagement by a supply member from the extruder.

4. Apparatus according to claim 3 wherein said surface is located on a side wall of said plug, the conduit of said plug extending from said inlet opening through an angle to the outlet end of said plug.

5. Apparatus according to claim 4 wherein said housing defines a lateral passage with which said inlet opening aligns when said plug is in place, said lateral passage sized to enable said supply member from the extruder to extend through said housing into sealing engagement with said sidewall of said plug, to supply molten plastic directly thereto.

6. Apparatus according to claim 5 wherein said housing defines an alignment surface adapted to be engaged by a side portion of said plug to align the outlet of said plug with said rotary section, said plug shaped to have a loose fit within said housing and to be pressed against said alignment surface by said supply member thereby enabling ready removal of said plug when said supply member is withdrawn.

7. Apparatus constructed to deliver molten plastic from an extruder to a rotary die orifice, said apparatus including a stationary conduit section communicating through a transition region to a rotary conduit section, a stationary supporting structure remote from the stationary-corotary conduit transition region supporting said rotary section in an aligned, slightly spaced-apart relation to said stationary section, thereby forming a clearance slot between the relatively moving sections, an annular transition member-retaining formation formed in the adjacent portion of at least one of the pair of said aligned section, said formation together with an opposed surface of the other aligned section forming a groove of axial dimension greater than said clearance space, said groove open to the conduit, and an annular transition and sealing member disposed within and substantially filling said groove and extending across said clearance space, the inner surface of said transition member forming a portion of the conduit and substantially smoothly aligned with the adjacent conduit surfaces of said stationary and rotary sections.

8. Apparatus according to claim 7 wherein the transition member is comprised of a low-friction plastic and said clearance slot being narrow to resist cold-flow of said transition member through said clearance slot under operating conditions.

9. Apparatus according to claim 7 wherein said stationary conduit section comprises an outer housing, and a removable conduit-forming plug disposed within said outer housing, the end of said plug engaging one side of said transition and sealing member.

10. Apparatus according to claim 7 wherein said rotary section is mounted on an adjustable support constructed to vary both the spacing of said clearance space and the size of said transition member-retaining formation.

11. Apparatus constructed to deliver molten plastic from an extruder to a rotary die orifice, said apparatus including a stationary conduit section and a rotary conduit section, said rotary section including a hollow spindle, a face seal of rigid material disposed between said spindle and an end surface of said stationary conduit section, a stationary bearing housing, annular bearings surrounding said spindle and disposed within said housing, a retainer means secured to said bearing housing and resiliently engaged against the outer stationary race of said bearings, a projection from said spindle engaging the inner race of said bearings, so that axial force applied by said retainer can be transferred through said bearings to said spindle, thus applying force to said outer bearing race whereby said spindle bears with substantial force against said face seal member, preloading said face seal member.

12. The apparatus of claim 11 wherein said retainer means comprises at least one conical, annular spring member having an outer diameter corresponding substantially to the diameter of the outer race of said bearing and a retainer cap engaged upon the inner portion of said spring forcing the outer portion thereof against the outer race of said bearing.

13. The apparatus of claim 11 wherein said face seal of rigid material is defined by a sintered layer of bronze particles, said layer impregnated with a mixture of low friction fluorocarbon plastic and lead powder.